US010300395B1

(12) United States Patent
Kornmann et al.

(10) Patent No.: US 10,300,395 B1
(45) Date of Patent: *May 28, 2019

(54) SYSTEMS AND METHODS FOR FILTERING COMMUNICATION WITHIN A LOCATION-BASED GAME

(71) Applicant: Niantic, Inc., San Francisco, CA (US)

(72) Inventors: David Kornmann, Tucson, AZ (US); Mark A. Aubin, Sunnyvale, CA (US); Alejandro Nijamkin, Simi Valley, CA (US)

(73) Assignee: Niantic, Inc., San Francisco, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 14/981,351

(22) Filed: Dec. 28, 2015

Related U.S. Application Data

(63) Continuation of application No. 13/955,171, filed on Jul. 31, 2013, now Pat. No. 9,226,106.

(60) Provisional application No. 61/677,822, filed on Jul. 31, 2012.

(51) Int. Cl.
A63F 13/87 (2014.01)
A63F 13/537 (2014.01)

(52) U.S. Cl.
CPC ............ A63F 13/87 (2014.09); A63F 13/537 (2014.09)

(58) Field of Classification Search
CPC .......... H04W 4/02; A63F 13/00; A63F 13/10; A63F 13/12; A63F 13/216; A63F 13/822; A63F 2300/69; A63F 2300/807
See application file for complete search history.

(56) References Cited

U.S. PATENT DOCUMENTS

| 6,530,841 | B2 | 3/2003 | Bull et al. | |
| 6,811,084 | B2 | 11/2004 | Tatsuta et al. | |
| 6,881,147 | B2* | 4/2005 | Naghi | A63F 13/06 273/148 B |
| 7,275,994 | B2* | 10/2007 | Eck | A63F 13/23 463/40 |
| 7,435,179 | B1* | 10/2008 | Ford | A63F 13/12 434/11 |

(Continued)

FOREIGN PATENT DOCUMENTS

| EP | 1 574 238 | 9/2005 |
| EP | 2 101 889 | 9/2009 |

(Continued)

OTHER PUBLICATIONS

Matyas, "Playful Geospatial Data Acquisition by Location-Based Gaming Communities", The International Journal of Virtual Reality, 2007, vol. 6, No. 3, pp. 1-10.

(Continued)

Primary Examiner — Babar Sarwar
(74) Attorney, Agent, or Firm — Fenwick & West LLP

(57) ABSTRACT

Systems and methods for filtering communication within a location-based game are disclosed. In one aspect, a method of filtering communication for a location-based game is disclosed. The method includes receiving, at a computing device, communication data for a plurality of players associated with the location based-game. The method further includes filtering the communication data for each player based on one or more signals associated with the respective player.

20 Claims, 6 Drawing Sheets

(56) References Cited

U.S. PATENT DOCUMENTS

| | | | |
|---|---|---|---|
| 7,437,409 B2* | 10/2008 | Danieli | A63F 13/12 709/204 |
| 7,491,123 B2 | 2/2009 | Smith | |
| 7,564,469 B2 | 7/2009 | Cohen | |
| 7,873,742 B1* | 1/2011 | Orvendal | H04L 67/303 707/613 |
| 7,946,919 B2 | 5/2011 | Piccionelli | |
| 7,970,749 B2* | 6/2011 | Uhlir | A63F 13/63 707/705 |
| 8,002,617 B1 | 8/2011 | Uskela et al. | |
| 8,016,675 B2* | 9/2011 | Squibbs | A63F 13/005 463/40 |
| 8,070,608 B2 | 12/2011 | Uhlir et al. | |
| 8,108,459 B1 | 1/2012 | Hoffman et al. | |
| 8,190,733 B1 | 5/2012 | Hoffman et al. | |
| 8,260,858 B2* | 9/2012 | Belz | A63F 13/12 709/205 |
| 8,267,794 B2 | 9/2012 | Van Luchene | |
| 8,282,491 B2* | 10/2012 | Auterio | A63F 13/12 463/42 |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 8,688,517 B2* | 4/2014 | Lutnick | G06Q 30/02 705/14.4 |
| 8,719,731 B2* | 5/2014 | Hamilton, II | G06F 3/011 715/848 |
| 8,734,238 B2* | 5/2014 | Arnone | G07F 17/3241 463/25 |
| 8,812,356 B1* | 8/2014 | Mahajan | G09B 7/02 705/14.2 |
| 8,968,099 B1* | 3/2015 | Hanke | A63F 13/57 463/42 |
| 8,990,299 B2* | 3/2015 | Konno | A63F 13/12 455/436 |
| 9,226,106 B1* | 12/2015 | Kornmann | H04W 4/02 |
| 2001/0009867 A1 | 7/2001 | Sakaguchi et al. | |
| 2002/0090985 A1 | 7/2002 | Tochner et al. | |
| 2003/0036428 A1 | 2/2003 | Aasland | |
| 2003/0224855 A1 | 12/2003 | Cunningham | |
| 2004/0029625 A1* | 2/2004 | Annunziata | A63F 13/10 463/1 |
| 2004/0058732 A1 | 3/2004 | Piccionelli | |
| 2004/0255032 A1* | 12/2004 | Danieli | A63F 13/12 709/229 |
| 2004/0255268 A1 | 12/2004 | Meijer et al. | |
| 2005/0049022 A1 | 3/2005 | Mullen | |
| 2005/0150796 A1* | 7/2005 | Wong | A45C 11/18 206/320 |
| 2005/0202862 A1* | 9/2005 | Shuman | A63F 13/10 463/9 |
| 2005/0206625 A1* | 9/2005 | Mattice | G06F 3/0416 345/173 |
| 2006/0105838 A1 | 5/2006 | Mullen | |
| 2006/0258420 A1 | 11/2006 | Mullen | |
| 2006/0281553 A1 | 12/2006 | Hawkins et al. | |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0104348 A1 | 5/2007 | Cohen | |
| 2007/0149284 A1 | 6/2007 | Plavetich et al. | |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |
| 2008/0113812 A1* | 5/2008 | Kwon | A63F 13/12 463/42 |
| 2008/0146338 A1* | 6/2008 | Bernard | A63F 13/00 463/42 |
| 2009/0005140 A1 | 1/2009 | Rose et al. | |
| 2009/0017913 A1* | 1/2009 | Bell | H04W 4/02 463/40 |
| 2009/0024986 A1 | 1/2009 | Meijer et al. | |
| 2009/0099924 A1* | 4/2009 | Lensch | G06Q 10/101 705/14.13 |
| 2009/0281851 A1 | 11/2009 | Newton et al. | |
| 2010/0287011 A1 | 11/2010 | Muchkaev | |
| 2010/0331089 A1 | 12/2010 | Priebatsch et al. | |
| 2011/0004658 A1 | 1/2011 | Chesley et al. | |
| 2011/0081973 A1 | 4/2011 | Hall | |
| 2011/0131404 A1* | 6/2011 | Lee | H04L 43/028 713/150 |
| 2011/0319148 A1* | 12/2011 | Kinnebrew | A63F 13/216 463/1 |
| 2012/0040745 A1 | 2/2012 | Auterio et al. | |
| 2012/0040763 A1* | 2/2012 | Auterio | A63F 13/12 463/42 |
| 2012/0052953 A1 | 3/2012 | Annambhotla et al. | |
| 2012/0094770 A1 | 4/2012 | Hall | |
| 2012/0157210 A1 | 6/2012 | Hall | |
| 2012/0185892 A1 | 7/2012 | Camplejohn et al. | |
| 2012/0190452 A1 | 7/2012 | Weston et al. | |
| 2012/0226627 A1 | 9/2012 | Yang | |
| 2012/0231887 A1 | 9/2012 | Lee et al. | |
| 2012/0233258 A1 | 9/2012 | Vijayaraghavan et al. | |
| 2012/0246104 A1 | 9/2012 | Di Sciullo et al. | |
| 2012/0315992 A1 | 12/2012 | Gerson et al. | |
| 2013/0004932 A1 | 1/2013 | Mahajan et al. | |
| 2013/0005475 A1* | 1/2013 | Mahajan | A63F 13/216 463/42 |
| 2013/0005480 A1 | 1/2013 | Bethke et al. | |
| 2013/0065692 A1* | 3/2013 | Aronzon | A63F 13/12 463/42 |
| 2013/0072308 A1 | 3/2013 | Peck et al. | |
| 2013/0117326 A1 | 5/2013 | De Smet et al. | |
| 2013/0178257 A1 | 7/2013 | Langseth | |
| 2013/0337916 A1* | 12/2013 | Saretto | A63F 13/92 463/32 |
| 2014/0011595 A1* | 1/2014 | Muller | A63F 13/45 463/42 |

FOREIGN PATENT DOCUMENTS

| | | |
|---|---|---|
| EP | 2 393 056 | 12/2011 |
| EP | 2 416 289 | 2/2012 |
| WO | WO 2002/062436 | 8/2002 |

OTHER PUBLICATIONS

United States Advisory Action, U.S. Appl. No. 13/955,171, dated Jun. 19, 2015, two pages.

United States Office Action, U.S. Appl. No. 13/955,171, dated Apr. 14, 2015, 14 pages.

United States Office Action, U.S. Appl. No. 13/955,171, dated Oct. 3, 2014, nine pages.

* cited by examiner

SYSTEMS AND METHODS FOR FILTERING COMMUNICATION WITHIN A LOCATION-BASED GAME

PRIORITY CLAIM

The present application claims the benefit of priority of U.S. Provisional Patent Application Ser. No. 61/677,822, titled Systems and Methods for Filtering Communication within a Location-Based Game, filed Jul. 31, 2012, which is incorporated herein by reference.

FIELD

The present disclosure relates generally to location-based gaming, and more particularly, to systems and methods for filtering communications of a location-based game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the virtual world such that player actions in the real world affect game play and/or objectives in the virtual world and vice versa.

In a location-based game having a virtual world that parallels the real world, it may be desirable to permit communication between players via a running communications feed of all communications in the game. As the number of players increases, however, the communication feed will be increasingly crowded. If a player perceives that the communications feed is overcrowded, they may choose to simply ignore it and use other means of communication to achieve their goals.

SUMMARY

Aspects and advantages of the invention will be set forth in part in the following description, or may be obvious from the description, or may be learned through practice of the invention.

In one aspect, the present subject matter is directed to a method of filtering communication for a location-based game. The method includes receiving, at a computing device, communication data for a plurality of players associated with the location based-game. The method further includes filtering the communication data for each player based on one or more signals associated with the respective player.

Other exemplary implementations of the present disclosure are directed to systems, apparatus, non-transitory computer-readable media, devices, user interfaces and other methods for verifying player proximity within a location-based game.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
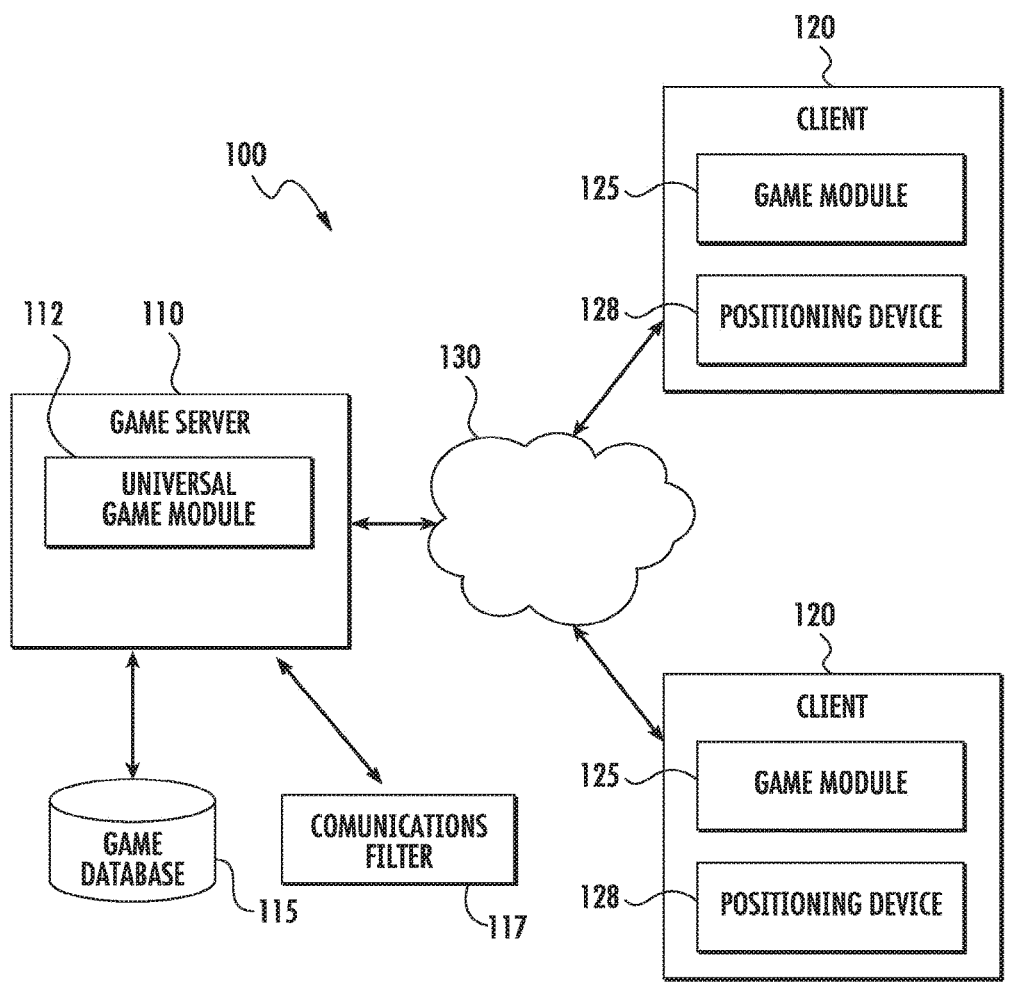
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

In general, the present subject matter is directed to systems and methods for filtering communications in a location-based game, such as a parallel reality game having a virtual world geography that parallels the real world geography. Game players can receive communications during the course of game play, such as communications between the game system and one or more players, or communications between one or more players. Such communications can be delivered to a player's device in the form of a communication feed, which can continuously stream communications to a player. According to one aspect of the present subject matter, one or more signals can be used to filter communications to a player of the game. Specifically, the signals can assist in ranking the importance of a communication and only the most relevant communications, as determined using signals selected by either the system or the player, are sent to the player.

Exemplary signals can relate to a player's location, a player's affinity for certain game elements, and/or a player's context within which the game is being played.

For instance, a first player's location can be utilized as a signal to filter communications from other players that are not located near the first player. In this manner, communications between players at a different location from a first player, such as on another continent, will not overcrowd the first player's communication stream. As used herein, a location can refer to a real world location or a virtual location.

With regards to a player's affinity for certain game elements, a first player can select to give priority to communications from players within the game that are also real world contacts of the first player. The first player's affinity for certain game elements (in this example, other players) can foster communication within the game.

Similarly, a player's context within which the game is being played can provide an effective signal for filtering communications. For instance, if a player is in attack mode, the player can be inclined to receive communications from other players that have the same goal. However, if the player is not in attack mode, the player can adjust the signal so as to not receive such communications.

Exemplary Location-Based Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
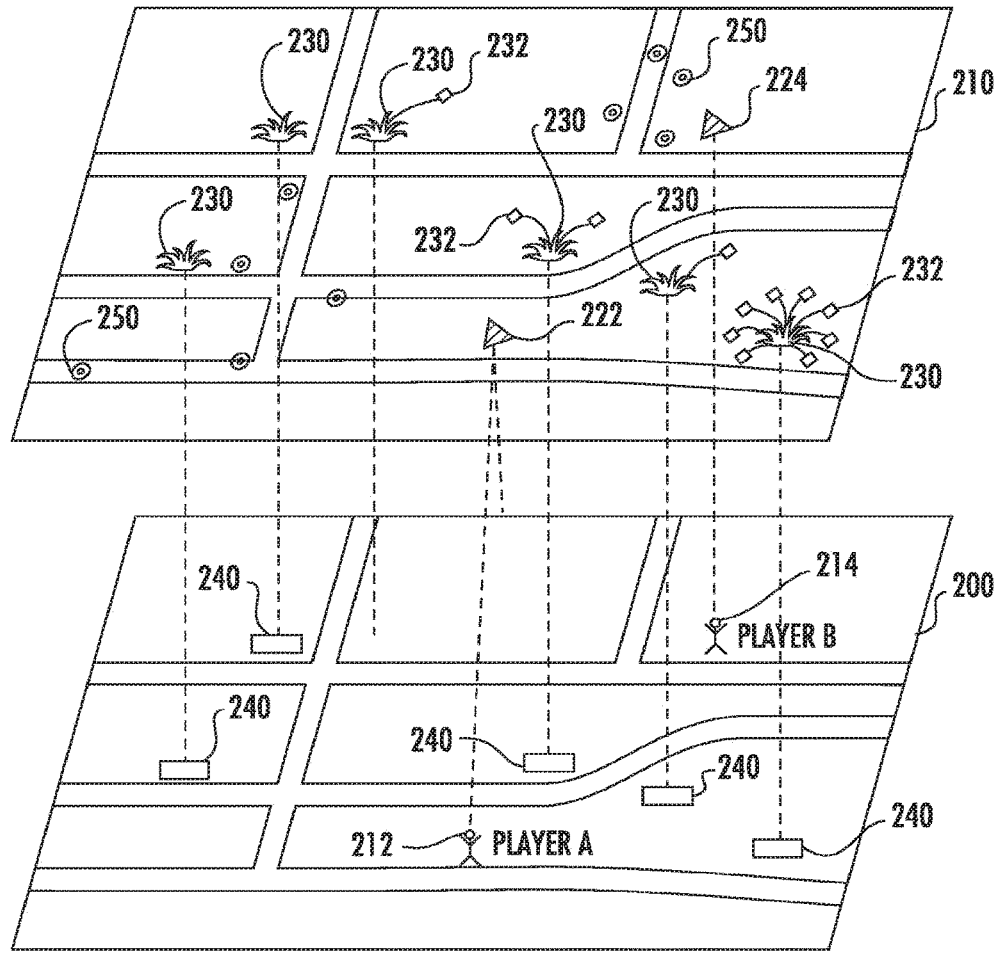
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230. In addition, interaction with a virtual element 230 may also require that two or more players be located in close proximity to a landmark 240 linked with that particular virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. Smaller subsets of teams or factions in the form of cells can also be developed. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. As described further herein, players can communicate with one another as well as the game system through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a communications filter 117.

Figure 3:
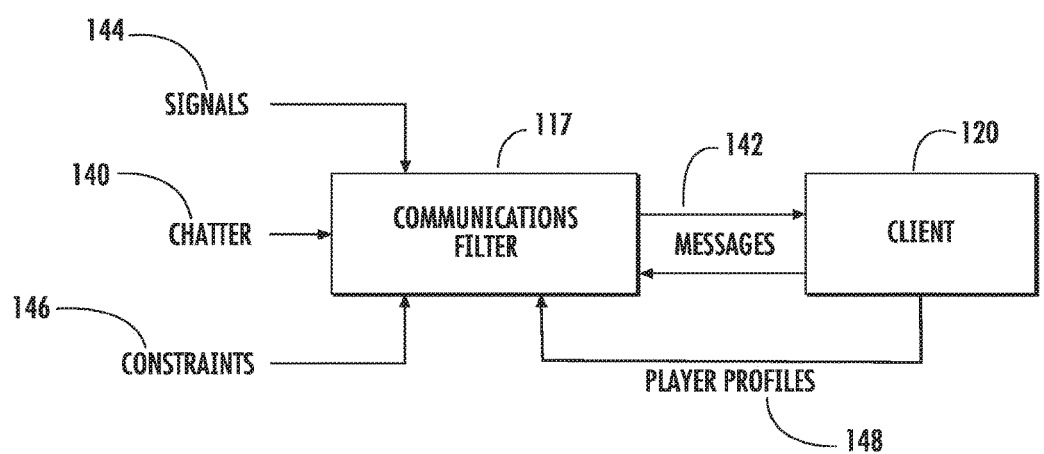
FIG. 3 depicts an exemplary computer-based communications filter for a location-based game according to an exemplary embodiment of the present disclosure.

Referring to FIG. 3, the computer-implemented communications filter 117 will be discussed in more detail. Communications filter 117 is in communication with client 120, either directly (as illustrated) or through game server 110 (depicted in FIG. 1). Communications filter 117 receives communication data or chatter 140, which can take the form of messages between players, game status updates from the game system, information from a game administrator, or the like. Such communication data 140 is filtered and sent to a client 120 as part of a filtered communication or message 142.

One or more signals 144 as will be described in more detail herein can be applied to the communication data 140 to filter the communication data before it is sent to client 120. One or more player profiles 148 in communication with client 120 can be utilized for ranking of the one or more signals 144 and the filtered communications 142 based on the same. In this manner, multiple signals can be tuned through one interface to give preference to certain signals versus others based on the communications desired to support game play.

One or more constraints 146 can be applied to the communication data 140 to ensure that certain communications are not filtered, irrespective of the signal 144 being applied. As mentioned previously, once filtered, the communication data 142 can be sent to client 120 (again, either directly or through game server 110).

Referring again to FIG. 1, the game server 110 can also include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications (which can be filtered through communications filter 117 as described herein), etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input and other updates the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, landmark information, etc.) and incorporates the game data received into the overall location-based game for all players of the location-based game. The universal game module 112 can also manage the delivery of game data to the clients 120 over the network 130.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any computing device that can be used by a player to interface with the gaming system 100. For instance, a client 120 can be a wireless device, a personal digital assistant (PDA), portable gaming device, cellular phone, smart phone, tablet, navigation system, handheld GPS system or other such device. In short, a client 120 can be any computer-device or system that can execute a gaming module 125 to allow a player to interact with the game system 100.

The client 120 can include a processor and a memory. The memory can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or wifi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world associated with the game based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 4:
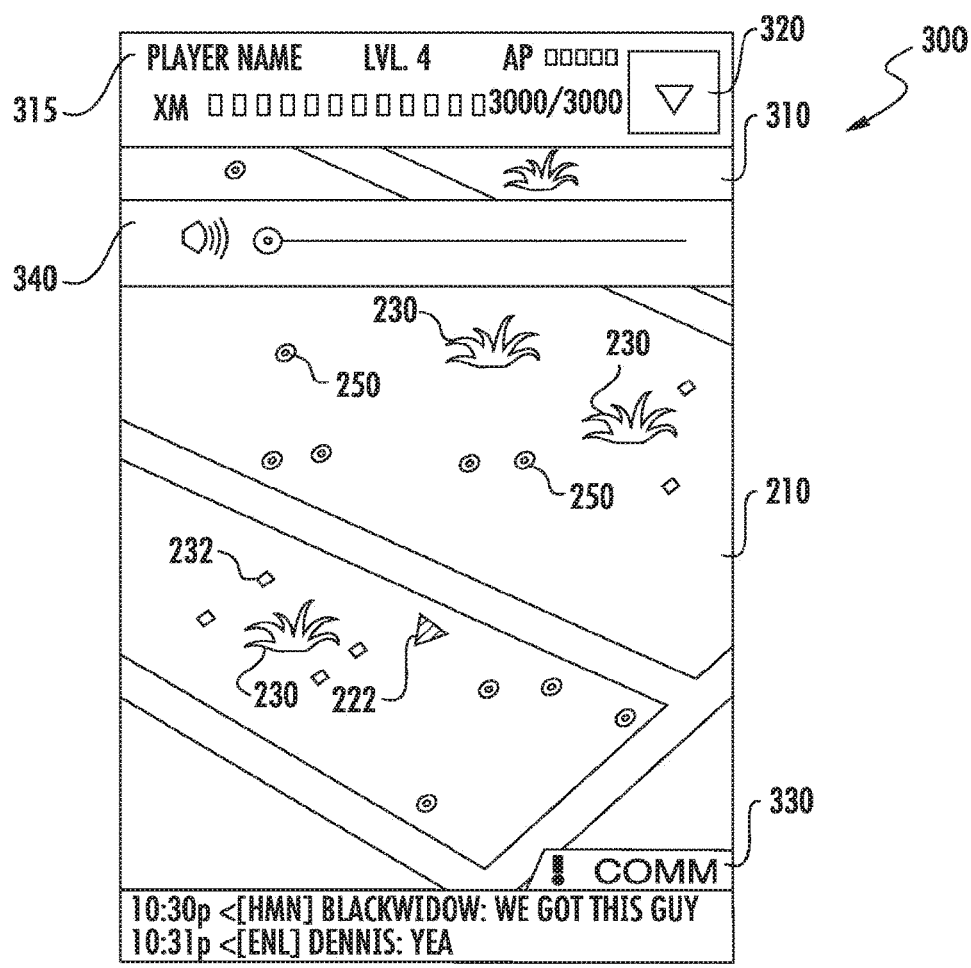
FIG. 4 depicts an exemplary game interface of a location-based game according to an exemplary embodiment of the present disclosure.

FIG. 4 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 212 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

Figure 5A:
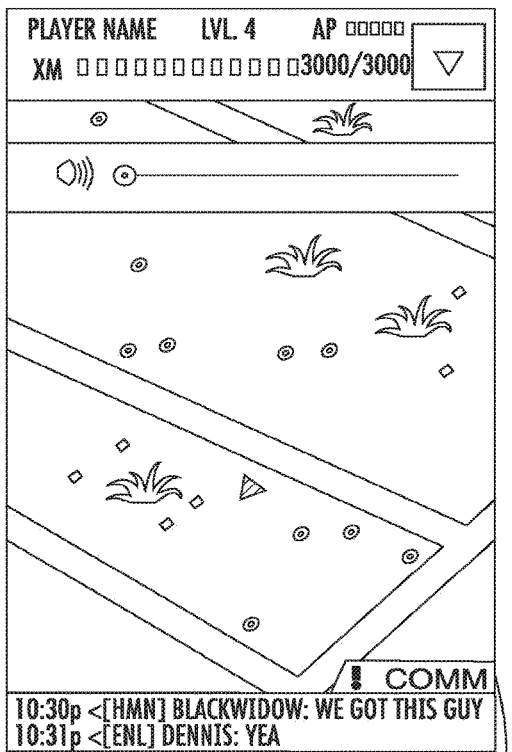
FIG. 5A depicts an exemplary minimized game communication interface of a location-based game according to an exemplary embodiment of the present disclosure.
Figure 5B:
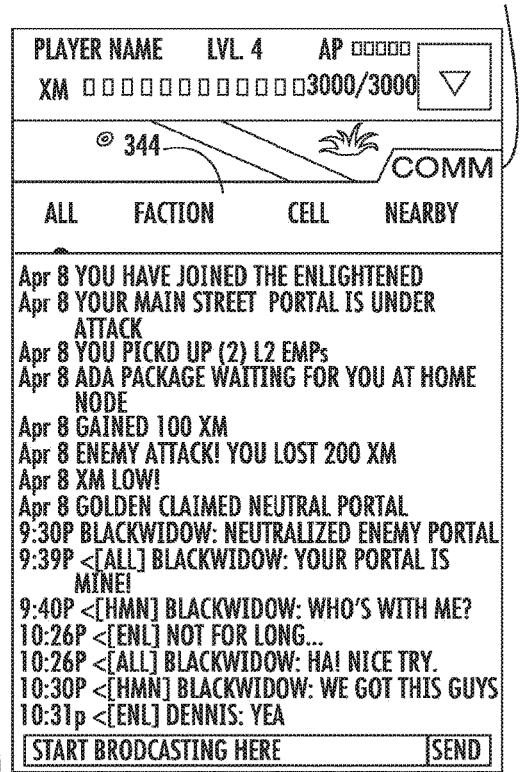
FIG. 5B depicts an exemplary expanded game communication interface of a location-based game according to an exemplary embodiment of the present disclosure.

Referring to FIGS. 5A and 5B, a particular embodiment of a communications interface 330 is depicted that can be presented on a display of a client 120 as part of the interface between a player and the gaming system 100. As described herein, communication data 140 can pass through communications filter 117 before filtered communication 142 is provided to client 120 and represented as a message 342 within communications interface 330. A notification such as the depicted "!" can indicate a new communication has been received by the communications interface 330.

FIG. 5A depicts the communications interface 330 as being minimized so as to allow additional screen space for other elements of the game. When minimized, only the most recent messages 342 are visible. However, communications interface 330 can be expanded as depicted in FIG. 5B to permit additional messages 342 to be visible. Player generated communications can be input in broadcast field 348. In the depicted expanded mode, one or more signals 344 can be selected for filtering communications. For instance, as illustrated communications based player faction, player cell, or nearby players, can be applied as signals for filter. However, as described herein, additional signals can be utilized in filtering communications. Furthermore, although signals are illustrated in the exemplary user interface, in certain aspects of the present disclosure, signals are automatically applied without any necessary user input.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game or when a communication is received. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Exemplary Signals for Filtering Communications

Exemplary signals for filtering communications associated with the game will now be set forth. The signals set forth herein are provided for purposes of illustration and discussion. Those of ordinary skill in the art, using the disclosures provided herein, should understand that the subject matter of the present disclosure extends to any suitable process or method for filtering communications in a virtual world based on signals associated with player attributes.

As described herein, one or more signals can be used to filter communications to a player of the game. Specifically, the signals can assist in ranking the importance of a communication so the most relevant communications, as determined using signals selected by either the system or the player, are sent to the player.

Exemplary signals can relate to a player's location, a player's affinity for certain game elements, and/or a player's context within which the game is being played.

For instance, a player's location can be utilized as a signal to filter communications from other players that are not located near the first player. Typically, such a signal can favor communications that are nearby in location to a player. Such a signal can be based on any suitable predetermined distance or radius from the player. However, a signal based on a player's location can also be utilized to ensure that players in isolated locations receive communications from a larger radius than players in densely populated areas would typically receive.

A player's level within the game can also be utilized as a signal. The player's level can correlate to experience in the game so it is conceivable that a player will be most interested in receiving communications from players in the game that are at a similar level.

With regards to a signal based on a player's affinity for certain game elements, a player can select to give priority to communications from players within the game that are also real world contacts of the first player. Real world contacts of the player can be determined through information provided within the game or through other affiliated applications, such as a messaging application (e.g., Google Inc.'s Gmail) or one or more social networking sites for which the user is affiliated, such as Google+ by Google Inc. It should be understood that information about a player is utilized only if permission is granted after the player has been notified of what information is to be accessed and how it is to be utilized. The player's affinity for certain game elements (in this example, other players) can foster communication within the game.

Such game elements can include the player's team or faction, or a custom team referred to as a cell. Teams can compete with one another so team members have a need to communicate with one another. Similarly, cell members can have strong incentive to coordinate and communicate because they can compete together against other cells.

In certain aspects, a game social graph can be utilized to signal affinity. For instance, portals, players, and locations can form nodes in a social graph, and portal links, ownership, and player locations can form edges of such graph. Each portal can have owners and contributors that share a natural affinity and need to work together to make the portal work successfully. As such, it is important to promote communications that are relevant to the state of a portal (e.g., portal under attack, portal undergoing decay, etc.) to players that have a high social affinity to that entity (e.g., owners, maintainers, cell members, players in the area, etc.).

Other suitable aspects utilize teamwork to capture a portal as a signal. For example, when trying to capture a portal, a player can seek out other players in the area. In yet another aspect, portal subscriptions or following other players can be utilized as signals based on affinity.

Similarly, a player's context within which the game is being played can provide an effective signal for filtering communications. For instance, if a player is in attack mode, the player can be inclined to receive communications from other players that have the same goal. However, if the player is not in attack mode, the player can adjust the signal so as to not receive such communications.

In other aspects of context within a game being utilized for a signal, friendly versus foe territory can be a signal since a player in friendly territory is more likely to take actions and block communications than a player in foe territory who will be inclined to receive enemy communications.

Other signals can include: 1) long range portal linking as a mechanism for communications between game participants that are geographically very far apart; 2) a call for help signal can assist within the context of the game in accomplishing a certain objective; 3) specific game actions can form a signal to modify the way communication is filtered; 4) a move to target mode signal can provide communications from other players in the vicinity of a portal to assist in capturing the portal; 5) game entities or game character signals can provide communications for entities or characters of interest; 6) spy mode and stealth mode can be signals utilized for covert monitor of communications that might otherwise be outside of the geographic area of interest.

In still other embodiments, time of day can act as a signal. For instance, at times of day when communications are lighter, more communications can be permitted whereas during busy times of day, the signal can serve to filter a greater number of communications.

In certain embodiments of the present disclosure, constraints can be used to override a signal. For instance, if a first user is communicating with a second user and the second user moves outside of the area of the first user, a signal may attempt to filter further communications. However, a constraint can allow the communication to take place.

The signals described herein can be applied to the communication data to filter the communication data before it is sent to client. In certain aspects of the present disclosure, one or more player profiles can be utilized for ranking of the signals and the filtered communications based on the same. In this manner, multiple signals can be tuned through one interface to give preference to certain signals versus others based on the communications desired to support game play.

Filtering Communication within a Location-Based Game

As indicated above, the present subject matter is generally directed to systems and methods for filtering communications to players of a location-based game, such as the game described above with reference to FIGS. 1-5. Filtering of communications can assist in preventing the game communication function from being cluttered with communication that isn't necessary for game play. For instance, referring back to FIG. 2, to capture or claim ownership of a virtual element 230 within the virtual world 210, it may be necessary for two or more players to be located proximate to a corresponding location 240 in the real world 200 at the same time so communication may be required to coordinate the timing of such real world interaction. Similarly, two or more players associated with the same team or faction may be provided the opportunity to gain additional items, energy, currency, experience points and/or the like through communications about the same.

Figure 6:
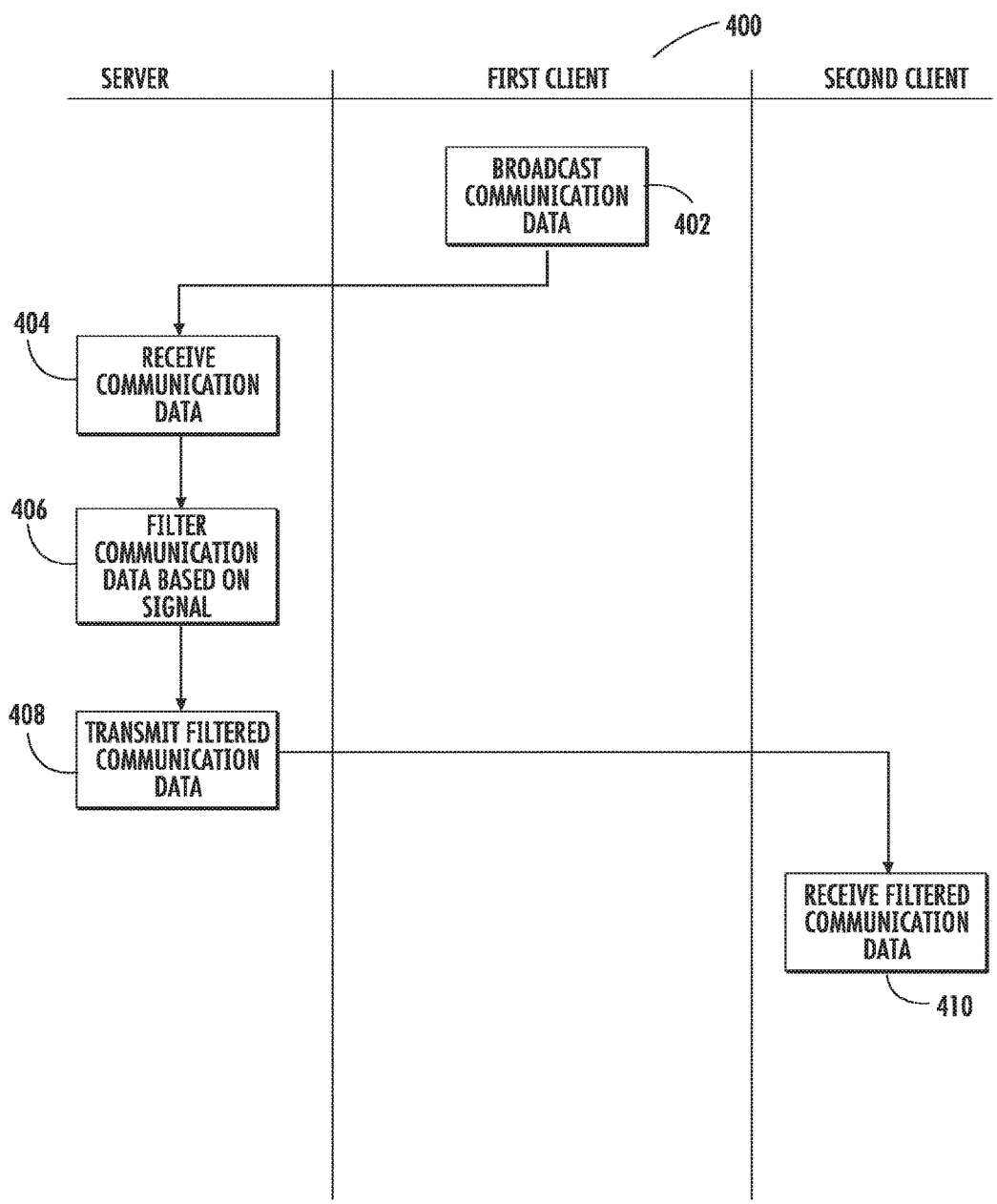
FIG. 6 depicts a server-client flow diagram of one embodiment of a method for filtering communication within a location-based game.

Referring now to FIG. 6, a server-client flow diagram of one embodiment of a method 400 for filtering communication is illustrated in accordance with aspects of the present subject matter. As shown, the method 400 will generally be described with reference to filtering communication from a first player having a first client (e.g., client 120 of FIG. 1) relative to a second player having a second client (e.g., client 120 of FIG. 1). However, it should be appreciated that the disclosed method 400 may generally be used to filter communications between any number of players of a location-based game.

At 402, the first client can transmit a communication data to server (e.g., game server 110 of FIG. 1). For instance, the first player can desire to "team-up" with a second player within the game. In such case, the first player can provide an input to the first client indicating this desire, such as by utilizing the broadcast field 348 displayed on a user interface of the first client (e.g., communications interface 330 of FIGS. 5A and 5B) and/or by providing any other suitable input. In response to such input, the first client may then transmit the request to the server to communicate the request through the communications feed of the game. In addition to "teaming-up" with another player, communications can be transmitted to the server for any other suitable reason. For example, as indicated above, game objectives may be completed and/or rewards may be obtained by coordinating through communication with other game players.

At 404, the server can receive the communication data from the first client and, at 406, can filter the communication based on one or more signals related to the second client. Specifically, the signals can assist in ranking the importance of the communication to the second client so that only the most relevant communications are transmitted to the communications feed of the second client. Exemplary signals can relate to a player's location, a player's affinity for certain game elements, and/or a player's context within which the game is being played. Optionally, the server can also apply one or more constraints to the filter to override a signal and permit a communication to proceed unfiltered to the second client.

Once the communication data has been filtered, the server can transmit the filtered communication data at 408 to the second client. The second client can receive the filtered communication data at 410 for presentation to the player. In this manner, communication from the first client pertaining to a game objective can be transmitted to a client (e.g., the second client for which the server has applied a filtering method to ensure relevance of the communication.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for filtering communication messages for a location-based game, the method comprising:
  identifying, by a computer system, a plurality of communication messages associated with a location based-game comprising a virtual world that parallels at least a portion of a real world, wherein movements of a player in the real world are paralleled in the virtual world;
  selecting, by the computer system from the plurality of communication messages, a subset of communication messages based on a distance between a real-world location of the player and real-world locations of additional players associated with the communication messages, wherein selecting the subset of communication messages comprises:
    determining the real-world location of the player; and
    selecting, from the plurality of communication messages, communication messages related to additional players located within a threshold distance of the real-world location of the player; and
  transmitting, by the computer system, the subset of messages to a client device associated with the player, the subset of messages displayed to the player via an interface of the location based-game.

2. The computer-implemented method of claim 1, further comprising:
  selecting, from the plurality of communication messages, an additional communication message not part of the subset of communication messages, the additional communication message selected based on a constraint applicable to the additional communication message; and
  transmitting the additional communication message to the client device.

3. The computer-implemented method of claim 2, wherein the constraint comprises not filtering communication messages that are a part of an ongoing communication exchange.

4. The computer-implemented method of claim 1, wherein selecting the subset of the plurality of communication messages is further based on a profile associated with the player.

5. The computer-implemented method of claim 1, wherein the threshold distance is determined based on a population density corresponding to the real-world location of the player.

6. The computer-implemented method of claim 1, wherein the plurality of communication messages comprise messages from additional players and game status updates.

7. The computer-implemented method of claim 1, wherein selecting the subset of communication messages is further based on which of the additional players are contacts of the player.

8. The computer-implemented method of claim 1, wherein selecting the subset of communication messages is further based on a mode associated with the player in the location-based game, and selecting the subset of communication messages further comprises:
  determining the mode associated with the player; and
  selecting, from the plurality of communication messages, communication messages from additional players associated with the determined mode.

9. The computer-implemented method of claim 1, wherein selecting the subset of communication messages is further based on a game level associated with the player in the location-based game, and selecting the subset of communication messages further comprises:
  determining the game level associated with the player; and
  selecting, from the plurality of communication messages, communication messages from additional players associated with the game level.

10. The computer-implemented method of claim 1, wherein select communication messages from the subset are displayed to the player and, responsive to the player requesting to expand the messages, the interface including the subset of messages is displayed to the player.

11. A non-transitory computer-readable medium storing computer-readable instructions that, when executed by one or more processors, cause the one or more processors to perform operations for filtering communication messages for a location-based game, the operations comprising:

identifying, by a computer system, a plurality of communication messages associated with a location based-game comprising a virtual world that parallels at least a portion of a real world, wherein movements of a player in the real world are paralleled in the virtual world;

selecting, by the computer system from the plurality of communication messages, a subset of communication messages based on a distance between a real-world location of the player and real-world locations of additional players associated with the communication messages, wherein selecting the subset of communication messages comprises:
  determining the real-world location of the player; and
  selecting, from the plurality of communication messages, communication messages related to additional players located within a threshold distance of the real-world location of the player; and transmitting, by the computer system, the subset of messages to a client device associated with the player, the subset of messages displayed to the player via an interface of the location based-game.

12. The non-transitory computer-readable medium of claim 11, wherein the operations further comprise:
  selecting, from the plurality of communication messages, an additional communication message not part of the subset of communication messages, the additional communication message selected based on a constraint applicable to the additional communication message; and
  transmitting the additional communication message to the client device.

13. The non-transitory computer-readable medium of claim 12, wherein the constraint comprises not filtering communication messages that are a part of an ongoing communication exchange.

14. The non-transitory computer-readable medium of claim 11, wherein selecting the subset of communication messages is further based on which of the additional players are contacts of the player.

15. The non-transitory computer-readable medium of claim 11, wherein select communication messages from the subset are displayed to the player and responsive to the player requesting to expand the messages, the interface including the subset of messages is displayed to the player.

16. The non-transitory computer-readable medium of claim 11, wherein the threshold distance is determined based on a population density corresponding to the real-world location of the player.

17. A non-transitory computer-readable medium storing computer-readable instructions that, when executed by one or more computer processors, cause the one or more computer processors to perform operations comprising:

identifying a plurality of communication messages associated with a location based-game comprising a virtual world that parallels at least a portion of a real world, wherein movements of a player in the real world are paralleled in the virtual world;

selecting, from the plurality of communication messages, a subset of communication messages based on a distance between a real-world location of the player and real-world locations of additional players associated with the communication messages;

selecting, from the plurality of communication messages, an additional communication message not part of the subset of communication messages, the additional communication message selected based on a constraint applicable to the additional communication message; and transmitting the subset of messages and the additional communication message to a client device associated with the player, the subset of messages and the additional communication message displayed to the player via an interface of the location based-game.

18. The non-transitory computer-readable medium of claim 17, wherein selecting the subset of communication messages comprises:
  determining the real-world location of the player; and
  selecting, from the plurality of communication messages, communication messages related to additional players located within a threshold distance of the real-world location of the player.

19. The non-transitory computer-readable medium of claim 18, wherein the threshold distance is determined based on a population density corresponding to the real-world location of the player.

20. The non-transitory computer-readable medium of claim 17, wherein the constraint comprises not filtering communication messages that are a part of an ongoing communication exchange.

* * * * *